United States Patent
Aoyagi et al.

(10) Patent No.: US 7,485,383 B2
(45) Date of Patent: *Feb. 3, 2009

(54) FUEL CELL POWER SUPPLY

(75) Inventors: Satoshi Aoyagi, Wako (JP); Hibiki Saeki, Wako (JP); Kazunori Watanabe, Wako (JP); Kazuo Kotaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/319,884

(22) Filed: Dec. 28, 2005

(65) Prior Publication Data

US 2006/0105206 A1   May 18, 2006

Related U.S. Application Data

(63) Continuation of application No. 10/117,298, filed on Apr. 5, 2002, now Pat. No. 7,005,204.

(30) Foreign Application Priority Data

Apr. 5, 2001   (JP)   ............... 2001-107501

(51) Int. Cl.
*H01M 8/04* (2006.01)
*H01M 8/00* (2006.01)
*B60L 11/18* (2006.01)
*H02J 7/00* (2006.01)

(52) U.S. Cl. ............... 429/24; 429/12; 320/101

(58) Field of Classification Search ............... 429/12, 429/24; 320/101; 700/295–298; 49/12, 49/24

See application file for complete search history.

(56) References Cited

U.S. PATENT DOCUMENTS

| 4,883,724 A | 11/1989 | Yamamoto et al. |
| 4,931,947 A | 6/1990 | Werth et al. |
| 6,100,665 A | 8/2000 | Alderman |
| 6,160,382 A | 12/2000 | Yoon et al. |
| 6,214,484 B1 * | 4/2001 | Hauer ............... 429/9 |

(Continued)

FOREIGN PATENT DOCUMENTS

JP   2-287807   11/1990

(Continued)

*Primary Examiner*—Gregg Cantelmo
(74) *Attorney, Agent, or Firm*—Lahive & Cockfield, LLP; Anthony A. Laurentano, Esq.

(57) ABSTRACT

A fuel cell power supply has a fuel cell and a capacitor which are connected parallel to each other, and controls the amount of a reacting gas supplied to the fuel gas based on a target supply current. A capacitor open voltage calculator calculates an open voltage (Vcap_O) of the capacitor from a detected current (Icap) of the capacitor, an output voltage (Vout) of the fuel cell, and an internal resistance (Rcap) of the capacitor. A corrective quantity calculator calculates a corrective quantity (Ifc_AM) for a target supply current (Ifc_REQ) based on the open voltage (Vcap_O) of the capacitor, the output voltage (Vout) of the fuel cell, and the target supply current (Ifc_REQ), so as to prevent an air compressor from operating excessively and also prevent the fuel cell from suffering a gas shortage, depending on current-voltage characteristic data (Icap–Vcap) of the fuel cell and current-voltage characteristic data (Ifc–Vcap) of the capacitor.

6 Claims, 6 Drawing Sheets

U.S. PATENT DOCUMENTS

| | | |
|---|---|---|
| 6,321,145 B1 | 11/2001 | Rajashekara |
| 6,326,763 B1 | 12/2001 | King et al. |
| 6,384,558 B2 | 5/2002 | Yoshida et al. |
| 6,480,767 B2 * | 11/2002 | Yamaguchi et al. ........... 701/22 |
| 6,573,682 B1 | 6/2003 | Pearson et al. |
| 6,684,135 B2 | 1/2004 | Uenodai et al. |
| 6,691,810 B2 | 2/2004 | Hasuka et al. |
| 7,005,204 B2 | 2/2006 | Aoyagi et al. |

FOREIGN PATENT DOCUMENTS

| | | |
|---|---|---|
| JP | 6-275296 | 9/1994 |
| JP | 11-320462 | 11/1999 |

* cited by examiner

FUEL CELL POWER SUPPLY

CROSS-REFERENCE TO RELATED APPLICATIONS

This application is a Continuation of Ser. No. 10/117,298 U.S. Pat. No. 7,005,204, which was filed on Apr. 5, 2002 now U.S. Pat. No. 7,005,204.

BACKGROUND OF THE INVENTION

The present invention relates to a fuel cell power supply comprising a fuel cell and a capacitor which are connected parallel to each other, and more particularly to the art of controlling the amount of a reacting gas supplied to a fuel cell.

Description of the Related Art

Heretofore, there is known a hybrid fuel cell power supply comprising a fuel cell and a capacitor which are connected parallel to each other. When a current demanded by the load of the fuel cell power supply increases sharply, if the fuel cell fails to supply a sufficient output current due to its response delay, then the capacitor discharges a current to make up for the output current shortage. See Japanese laid-open patent publication No. 6-275296, for example, for details.

In the known hybrid fuel cell power supply, the amount of a reacting gas (a reducing gas such as hydrogen or the like which serves as a fuel and/or an oxidizing gas such as air or the like for reacting with the reducing gas to extract electrons) supplied to the fuel cell is controlled depending on a target supply current which is determined based on the current demanded by the load of the fuel cell power supply.

The inventor of the present invention has found that in a hybrid fuel cell power supply comprising a fuel cell and an electric-double-layer capacitor of extremely large electrostatic capacitance which are connected parallel to each other, when the amount of a reacting gas supplied to the fuel cell is controlled depending on a target supply current which is determined based on the current demanded by the load of the fuel cell power supply, a compressor for supplying the reacting gas may operate excessively or the supplied reacting gas may run short because of the response delay of a system for supplying the reacting gas.

If the compressor for supplying the reacting gas operates excessively, then it tends to waste the electric power supplied thereto. If the supplied reacting gas suffers a shortage, then the electrolytic membrane of the fuel cell is liable to deteriorate, resulting in a performance failure of the fuel cell.

BRIEF SUMMARY OF THE INVENTION

According to the present invention, there is provided a fuel cell power supply having a fuel cell, reacting gas supply means for supplying a reacting gas to the fuel cell, fuel cell control means for controlling an amount of the reacting gas supplied from the reacting gas supply means to the fuel cell based on a target supply current determined depending on a current demanded by a load when the fuel cell is connected to the load and a current is supplied to the load, and a capacitor connected parallel to the fuel cell and chargeable by the fuel cell, the capacitor being dischargeable to supply the current demanded by the load when the target supply current increases within a time shorter than a response delay which is caused in the fuel cell while the fuel cell control means controls an output current of the fuel cell, and the output current of the fuel cell is smaller than the current demanded by the load.

With the above fuel cell power supply, if the response delay is caused when the target supply current is increased and the current supplied from the fuel cell runs short, the capacitor discharges a current commensurate with the shortage. If the reacting gas supply means controls the amount of the reacting gas supplied to the fuel cell depending on the target supply current determined based on the current demanded by the load, then the reacting gas supply means operates excessively, consuming a wasteful amount of energy in the process of progressively eliminating the response delay.

If the response delay is caused when the target supply current is reduced and the current supplied from the fuel cell becomes excessive, the capacitor is charged by the excessive current. If the reacting gas supply means controls the amount of the reacting gas supplied to the fuel cell depending on the target supply current determined based on the current demanded by the load, then the supplied reacting gas suffers a shortage commensurate with the current used to charge the capacitor in the process of progressively eliminating the response delay.

The fuel cell power supply comprises charging/discharging state recognizing means for recognizing a charging/discharging state of the capacitor, and target supply current correcting means for, when the target supply current undergoes a change causing the response delay, performing at least one of a first correcting process of reducing the target supply current if the change is an increase in the target supply current, and a second correcting process of increasing the target supply current if the change is a reduction in the target supply current, depending on the charging/discharging state of the capacitor recognized by the charging/discharging state recognizing means.

When the target supply current increases, the target supply current correcting means carries out the first correcting process to reduce the target supply current, thereby preventing the reacting gas supply means from operating excessively to prevent a wasteful amount of energy from being consumed. When the target supply current decreases, the target supply current correcting means carries out the second correcting process to increase the target supply current, thereby preventing the reacting gas from suffering shortage due to the charging current flowing into the capacitor.

The charging/discharging state recognizing means comprises means for recognizing an open voltage of the capacitor as the charging/discharging state, and the target supply current correcting means comprises means for performing the first correcting process by determining a prescribed voltage at which a current produced by adding a discharging current of the capacitor depending on the prescribed voltage which is recognized from voltage-current characteristic data of the capacitor based on the open voltage of the capacitor recognized by the charging/discharging state recognizing means, to the output current of the fuel cell depending on the prescribed voltage which is recognized from voltage-current characteristic data of the fuel cell, is equal to the target supply current, and subtracting the discharging current of the capacitor depending on the prescribed voltage from the target supply current.

In the first correcting process, the target supply current correcting means determines the prescribed voltage at which the current produced by adding the discharging current of the capacitor to the output current of the fuel cell is equal to the target supply current, based on the voltage-current characteristic data of the fuel cell and the voltage-current characteristic data of the capacitor. The target supply current correcting means then subtracts the discharging current of the capacitor depending on the prescribed voltage which is determined based on the actual voltage-current characteristic data of the fuel cell and the capacitor, from the target supply current, for thereby correcting the target supply current with high accuracy to prevent the reacting gas supply means from operating excessively.

The charging/discharging state recognizing means comprises means for recognizing an open voltage of the capacitor as the charging/discharging state, and the target supply current correcting means comprises means for performing the second correcting process by determining a prescribed voltage at which a current produced by subtracting a charging current of the capacitor depending on the prescribed voltage which is recognized from voltage-current characteristic data of the capacitor based on the open voltage of the capacitor recognized by the charging/discharging state recognizing means, from the output current of the fuel cell depending on the prescribed voltage which is recognized from voltage-current characteristic data of the fuel cell, is equal to the target supply current, and adding the charging current of the capacitor depending on the prescribed voltage to the target supply current.

In the second correcting process, the target supply current correcting means determines the prescribed voltage at which the current produced by subtracting the charging current of the capacitor from the output current of the fuel cell is equal to the target supply current, based on the voltage-current characteristic data of the fuel cell and the voltage-current characteristic data of the capacitor. The target supply current correcting means then adds the charging current of the capacitor depending on the prescribed voltage which is determined based on the actual voltage-current characteristic data of the fuel cell and the capacitor, to the target supply current, for thereby correcting the target supply current with high accuracy to prevent the reacting gas supplied to the fuel gas from suffering a shortage.

The fuel cell power supply further comprises capacitor voltage detecting means for detecting an output voltage of the capacitor, memory means for storing resistance data of an internal resistance of the capacitor, and capacitor current detecting means for detecting a charging/discharging current of the capacitor, the charging/discharging state recognizing means comprising means for calculating a voltage drop across the internal resistance based on the resistance data stored by the memory means and the charging/discharging current detected by the capacitor current detecting means, and recognizing the open voltage of the capacitor from the voltage detected by the capacitor voltage detecting means and the calculated voltage drop.

With the above arrangement, the charging/discharging state recognizing means is capable of accurately recognizing the open voltage of the capacitor based on the voltage detected by the capacitor voltage detecting means and the current detected by the capacitor current detecting means. Therefore, the target supply current correcting means can accurately correct the target supply current depending on the open voltage of the capacitor which is recognized by the charging/discharging state recognizing means.

The above and other objects, features, and advantages of the present invention will become apparent from the following description when taken in conjunction with the accompanying drawings which illustrate a preferred embodiment of the present invention by way of example.

DETAILED DESCRIPTION OF THE INVENTION

Figure 1:
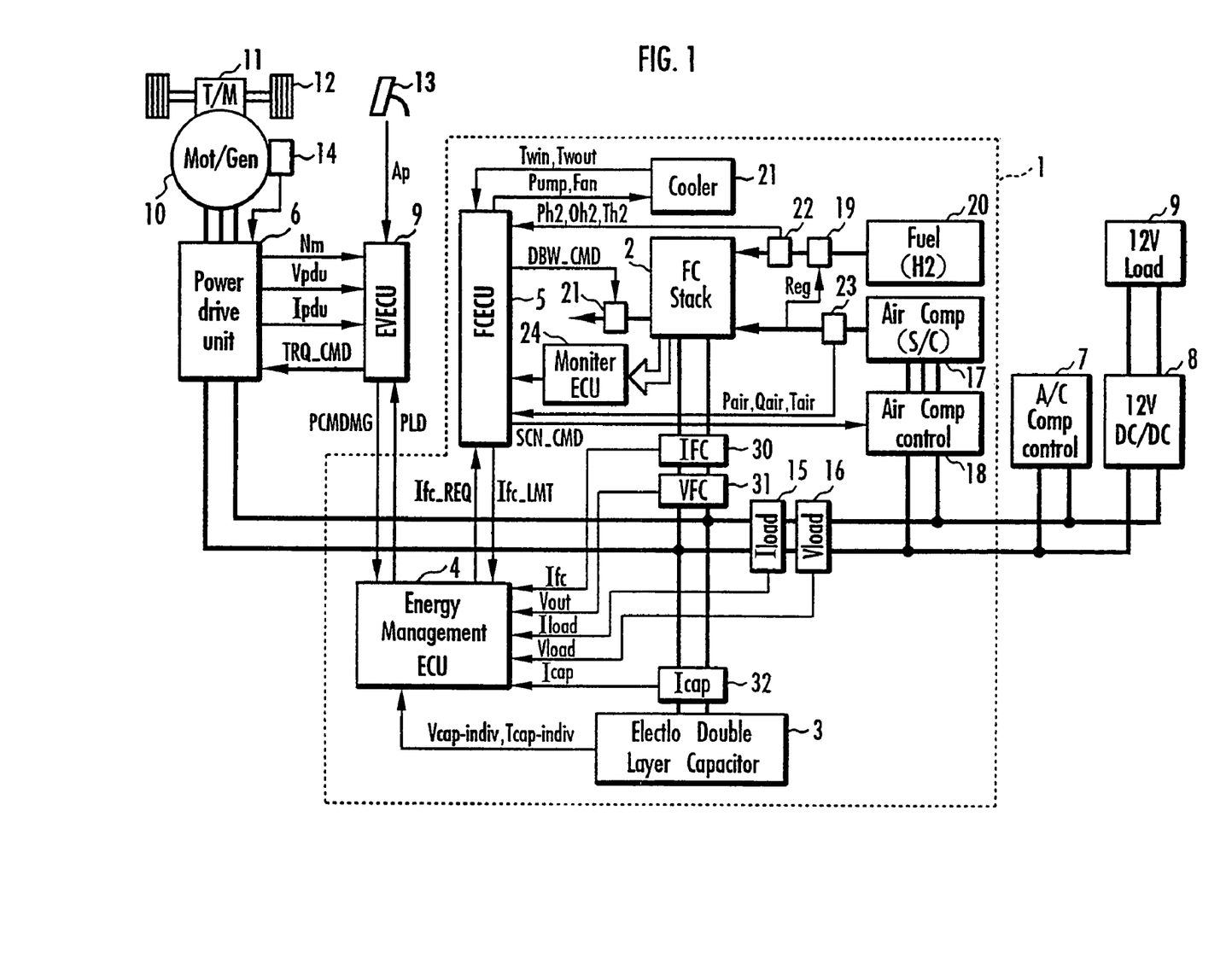
FIG. 1 is a block diagram of a fuel cell power supply according to the present invention.

As shown in FIG. 1, a fuel cell power supply 1 according to the present invention is mounted on a motor vehicle and functions as a power supply for propelling the motor vehicle. The fuel cell power supply 1 is a hybrid fuel cell power supply comprising a fuel cell 2 for outputting a current by bringing about an electrochemical reaction using oxygen and air as a reacting gas and an electric double layer capacitor 3 (hereinafter simply referred to as "capacitor 3") which is connected parallel to the fuel cell 2. The output current of the fuel cell power supply 1 is controlled by an energy management means 4 and a fuel cell control means 5 which may comprise a microcomputer or the like.

The output energy of the fuel cell power supply 1 is supplied to a power drive unit 6, an air-conditioner 7, and a 12-V load 9 via a DC/DC converter 8. The power drive unit 6 detects the electric angle of the rotor (not shown) of a motor 10 with an angle sensor 14, and outputs a 3-phase AC voltage depending on the electric angle to the armature (not shown) of the motor 10. The power drive unit 6 controls a current flowing through the armature of the motor 10 according to a torque command (TRQ_CMD) outputted from an electric vehicle control unit 9. The drive power generated by the motor 10 is transmitted through a transmission 11 to drive wheels 12.

The electric vehicle control unit 9 outputs a signal representative of the energy (PCMDMG) required by the power drive unit 6 to the energy management means 4 based on the amount of depression (Ap) of an accelerator pedal 13, the rotational speed of the motor 10, the voltage (Vpdu) applied to the armature of the motor 10, and the current (Ipdu) flowing through the armature of the motor 10.

The energy management means 4 is supplied with a detected signal indicative of a load current (I_load) detected by a load current sensor 15 and a detected signal indicative of a load voltage (V_load) detected by a load voltage sensor 16, for recognizing the electric energy consumed by electric accessories other than the motor 10. The energy management means 4 recognizes the electric energy consumed by the electric accessories other than the motor 10 based on the supplied detected signals.

The energy management means 4 determines a target supply current (Ifc_REQ) depending on the sum of the electric energy consumed by the power drive unit 6 and the electric energy consumed by the electric accessories other than the motor 10 in view of an upper limit value (Ifc_LMT), outputted from the fuel cell control means 5, for the current that can be supplied from the fuel cell 2, individual output voltages (Vcap_indiv) of the capacitor cells of the capacitor 3, and individual temperatures (Tcap_indiv) of the capacitor cells, and outputs a signal indicative of the determined target supply current (Ifc_REQ) to the fuel cell control means 5. The energy management means 4 outputs a signal indicative of the electric energy (PLD) that can be supplied, to the electric vehicle control unit 9.

The fuel cell control means 5 is supplied with detected signals, outputted from an air supply sensor 23, indicative of the pressure (Pair), quantity (Qair), and temperature (Tair) of air supplied to air electrodes of the fuel cell 2, and also with detected signals, outputted from an oxygen supply sensor 22, indicative of the pressure ($PH_2$), quantity ($QH_2$), and temperature ($TH_2$) of hydrogen supplied to hydrogen electrodes of the fuel cell 2. The fuel cell control means 5 is also supplied with detected signals, outputted from a monitor unit 24, indicative of the individual states of fuel cell elements of the stack (not shown) of the fuel cell 2. The fuel cell control means 5 determines the upper limit value (Ifc_LMT) for the current that can be supplied from the fuel cell 2 in view of the status of the fuel cell 2 that is recognized from the detected signals which are supplied to the fuel cell control means 5.

The electric vehicle control unit 9 outputs a torque command (TRQ_CMD) to the power drive unit 6 so as not to exceed the electric energy (PLD) that can be supplied which is indicated by the energy management means 4. The power drive unit 6 controls the armature current of the motor 10 so that the motor 10 will generate a torque depending on the torque command (TRQ_CMD).

The fuel cell control means 5 outputs a rotational speed command (SCN_CMD) for the compressor motor (not shown) of an air compressor 17 to an air compressor controller 18 which controls the rotational speed of the compressor motor of the air compressor 17 that supplies air to the air electrodes of the fuel cell 2, so that the target output current (Ifc_REQ) outputted from the energy management means 4 will be outputted from the fuel cell 17.

The air compressor controller 18 controls the rotational speed of the compressor motor at the rotational speed command (SCN_CMD), supplying air at a rate depending on the target output current (Ifc_REQ) to the air electrodes of the fuel cell 2. At this time, a proportional pressure regulator 19 whose opening varies depending on the pressure of air supplied from the air compressor 17 regulates the pressure of hydrogen that is supplied from a high-pressure hydrogen tank 20 to the hydrogen electrodes of the fuel cell 2 for thereby balancing the amount of air and the amount of hydrogen that are supplied to the fuel cell 2.

The air compressor controller 18, the air compressor 17, the high-pressure hydrogen tank 20, and the proportional pressure regulator 19 jointly make up a reacting gas supply means according to the present invention.

The hydrogen which has been regulated in pressure by the proportional pressure regulator 19 is supplied through an ejector (not shown) and a humidifier (not shown) to the hydrogen electrodes of the fuel cell 2. In the fuel cell 2, the supplied hydrogen reacts electrochemically with the oxygen in the air that is supplied to the air electrodes of the fuel cell 2, producing water which is discharged through a drain valve 21. The opening of the drain valve 21 is controlled by a control signal (DVW_CMD) from the fuel cell control means 21 such that the pressure gradient in the fuel cell 2 is kept constant depending on the pressures under which the air and the hydrogen are supplied.

A cooler 21 has a cooling pump (not shown) for circulating cooling water, which has been cooled by way of heat radiation by a radiator (not shown), through the fuel cell 2, and a cooling fan (not shown). The fuel cell control means 5 controls the operation of the cooling pump and the cooling fan depending on the temperature (Tw_in) of the cooling water supplied to the fuel cell 2 and the temperature (Tw_out) of the cooling water discharged from the fuel cell 2.

The fuel cell power supply 1 also has a fuel cell current sensor 30 for detecting the output current (Ifc) of the fuel cell 2, a fuel cell voltage sensor 31 for detecting the output voltage (Vfc) of the fuel cell 2, and a capacitor current sensor 32 for detecting the charging/discharging current (Icap) of the capacitor 3. Detected signals from these sensors are supplied to the energy management means 4.

Figure 2:
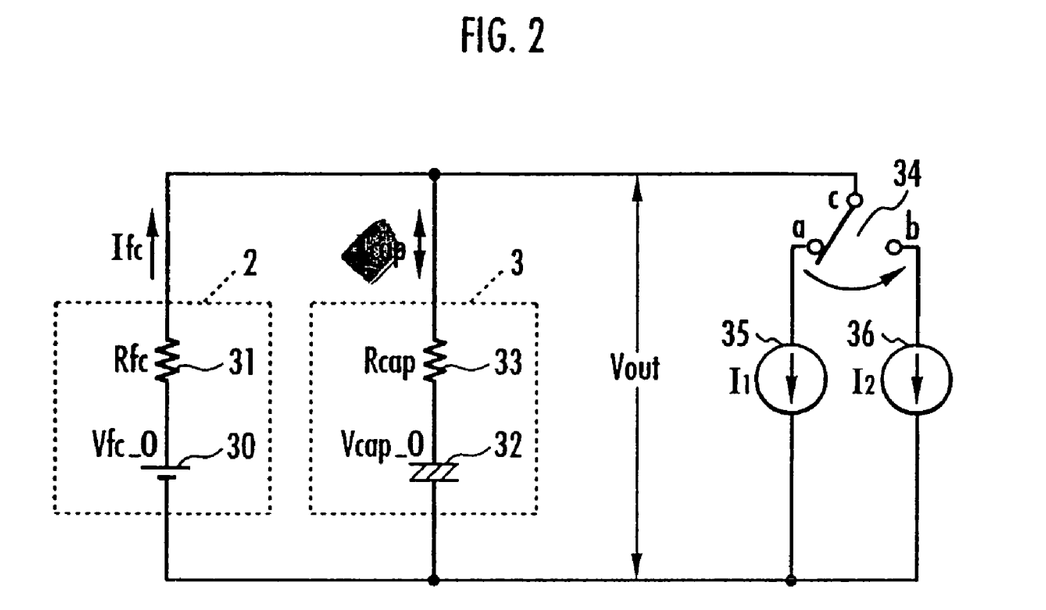
FIG. 2 is a circuit diagram of an equivalent circuit of the fuel cell power supply shown in FIG. 1.

Operation of the fuel cell power supply 1 at the time the target supply current (Ifc_REQ) outputted from the energy management means 4 to the fuel cell control means 5 will be described below with reference to FIG. 2. FIG. 2 is a circuit diagram of an equivalent circuit of the fuel cell power supply 1. In the equivalent circuit shown in FIG. 2, the fuel cell 2 is expressed as a series-connected circuit of a voltage source 30 having no internal resistance and an open voltage of Vfc_0 and an internal resistor 31 having a resistance of Rfc, and the capacitor 3 is expressed as a series-connected circuit of a capacitor 32 having no internal resistance and an open voltage of Vcap_0 and an internal resistor 33 having a resistance of Rcap.

In FIG. 2, Ifc represents the output current of the fuel cell 2, Icap the output current of the capacitor 3, 35 a constant-current source of a current $I_1$, 36 a constant-current source of a current $I_2$ (>$I_1$), and Vout the output voltage of the fuel cell 2 (=the output voltage of the capacitor 3).

In the equivalent circuit shown in FIG. 2, when the load current, which is the sum of the current supplied to the power drive unit 6 and the current supplied to the electric accessories other than the motor 10, increases from $I_1$ (when contacts c, a of a switch 34 are connected to each other) to $I_2$ (when contacts c, b of the switch 34 are connected to each other), the energy management means 4 increases the target supply current (Ifc_REQ) outputted to the fuel cell control means 5 in a manner commensurate with the increase in the load current.

As described above with reference to FIG. 1, the rotational speed command (SCN_CMD) depending on the load change is outputted from the fuel cell control means 5 to the air compressor controller 18 which actuates the air compressor 7, and the rotational speed of the compressor motor of the air compressor 17 increases according to the rotational speed command (SCN_CMD). As a result, the amounts of air and hydrogen supplied to the fuel cell 2 are increased, after which the electrochemical reaction in the fuel cell 2 becomes more intensive, producing an output current depending on the increased target supply current (Ifc_REQ). Therefore, the fuel cell 2 suffers a certain response delay until the output current thereof becomes equal to a value commensurate with the load change.

The fuel cell power supply 1 prevents a shortage of the current supplied to the load by supplying a current from the capacitor 3 connected parallel to the fuel cell 2 to the load while the fuel cell 2 is suffering the response delay.

FIG. 3(a) shows the manner in which the discharging current (Icap) of the capacitor 3 changes when the load current is increased and the fuel cell 2 suffers a response delay. FIG. 3(a) includes a graph ① having a vertical axis representative of the target supply current (Ifc_REQ) and a horizontal axis of time, and a graph ② having a vertical axis representative of the discharging current (Icap) of the capacitor 3 and a horizontal axis of time.

In the graph ① of FIG. 3(a), a period $t_{10}$-$t_{11}$ represents a balanced state in which the target supply current (Ifc_REQ) is $I_1$ and the output current of the fuel cell 2 is controlled at $I_1$. In this period, no discharging current flows from the capacitor 3 (Icap=0). At the time $t_{11}$, the load current increases from $I_1$ to $I_2$ in a step response fashion. Even when the target supply current (Ifc_REQ) increases from $I_1$ to $I_2$ in a step response fashion in response to the increase in the load current, the output current of the fuel cell 2 does not immediately reach $I_2$ because of the response delay described above.

Figure 3:
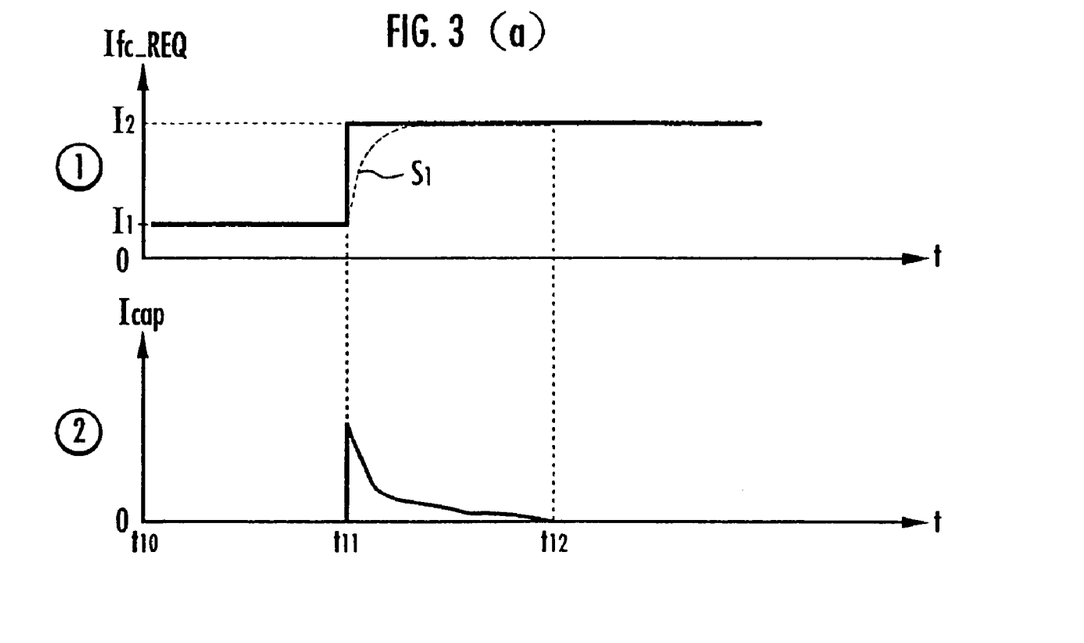
FIGS. 3(a) and 3(b) are graphs showing transitions of an output current from a capacitor at the time a response delay occurs in a fuel cell.

As shown in the graph ② of FIG. 3(*a*), the discharging current (Icap) flows from the capacitor 3 to the load. The equivalent circuit shown in FIG. 2 satisfies the following equations (1), (2):

$$I_2 = Ifc + Icap \tag{1}$$

$$Icap = (Vcap\_O - Vout)/Rcap \tag{2}$$

As the output current (Ifc) of the fuel cell 2 increases when the electrochemical reaction becomes more intensive in the fuel cell 2, since the load current ($I_2$) is constant, the discharging current (Icap) is progressively reduced according to the equation (1) as shown in the graph ② of FIG. 3(*a*).

During a response delay period $t_{11}$-$t_{12}$, because the discharging current (Icap) is outputted from the capacitor 3, the fuel cell 2 is not required to output a current commensurate with $I_2$, but a current commensurate with $I_2$-Icap. Therefore, if the rotational speed command (SCN_CMD) depending on $I_2$ is outputted to the air compressor controller 18 during the response delay period $t_{11}$-$t_{12}$, then the air compressor 17 is operated excessively at a higher rate than required, wasting some electric energy.

As indicated by $S_1$ in the graph ① of FIG. 3(*a*), the fuel cell control means 5 performs a first correcting process to reduce the target supply current (Ifc_REQ) depending on the magnitude of the discharging current (Icap) of the capacitor 3, thereby preventing the air compressor 17 from being operated excessively.

When the target supply current (Ifc_REQ) is reduced, as when the target supply current (Ifc_REQ) is increased, the fuel cell 2 suffers a response delay at the time the electrochemical reaction becomes less intensive in the fuel cell 2, reducing the output current of the fuel cell 2 to a value commensurate with the target supply current. FIG. 3(*b*) shows the manner in which the discharging current (Icap) of the capacitor 3 changes when the load current is reduced and the fuel cell 2 suffers a response delay. FIG. 3(*b*) includes a graph ③ having a vertical axis representative of the target supply current (Ifc_REQ) and a horizontal axis of time, and a graph ④ having a vertical axis representative of the discharging current (Icap) of the capacitor 3 and a horizontal axis of time.

In the graph ③ of FIG. 3(*b*), a period $t_{20}$-$t_{21}$ represents a balanced state in which the target supply current (Ifc_REQ) is $I_2$ and the output current of the fuel cell 2 is controlled at $I_2$. In this period, no charging current flows into the capacitor 3 (Icap=0). At the time $t_{21}$, the load current decreases from $I_2$ to $I_1$ in a step response fashion. Even when the target supply current (Ifc_REQ) decreases from $I_2$ to $I_1$ in a step response fashion in response to the decrease in the load current, the output current of the fuel cell 2 does not immediately reach $I_1$ because of the response delay described above.

As shown in the graph ④ of FIG. 3(*b*), the charging current (Icap) flows from the fuel cell 2 into the capacitor 3. The equivalent circuit shown in FIG. 2 satisfies the following equations (3), (4):

$$I_1 = Ifc - Icap \tag{3}$$

$$Icap = (Vout - Vcap\_O)/Rcap \tag{4}$$

As the output current (Ifc) of the fuel cell 2 decreases when the electrochemical reaction becomes less intensive in the fuel cell 2, since the load current ($I_1$) is constant, the charging current (Icap) is progressively reduced according to the equation (3) as shown in the graph ④ of FIG. 3(*b*).

During a response delay period $t_{21}$-$t_{22}$, because some of the output current (Ifc) of the fuel cell 2 is used to charge the capacitor 3, it is necessary for the fuel cell 2 to output a current commensurate with $I_1$+Icap. Therefore, if the rotational speed command (SCN_CMD) depending on $I_1$ is outputted to the air compressor controller 18 during the response delay period $t_{21}$-$t_{22}$, then the amount of at least one of air and hydrogen supplied to the fuel cell 2 depending on the rotational speed of the compressor motor of the air compressor 17 runs short, tending to deteriorate the fuel cell 2.

As indicated in the graph ③ of FIG. 3(*b*), the energy management means 4 (which performs the functions of a charging/discharging state recognizing means and a target supply current correcting means) performs a second correcting process correcting process to increase the target supply current (Ifc_REQ) depending on the magnitude of the charging current (Icap) of the capacitor 3, thereby preventing the amount of the gas supplied to the fuel cell 2 from suffering a shortage.

A specific sequence for determining a corrective quantity for the target supply current (Ifc_REQ) during the response delay period of the fuel cell 3 will be described below with reference to FIG. 4.

The energy management means 4 detects the output current of the fuel cell 2 (Vout=the output voltage of the capacitor 3) with the fuel cell voltage sensor 31 and also detects the charging/discharging current (Icap) of the capacitor 3 with the capacitor current sensor 32. The energy management means 4 then calculates an open voltage of the capacitor 3 (Vcap_O, corresponding to the charging/discharging state of the capacitor according to the present invention) according to the following equation (5):

$$Vcap\_O = Vout + Icap \cdot Rcap \tag{5}$$

The resistance of the internal resistor (Rcap) of the capacitor 3 is stored in a data memory of the microcomputer which serves as the energy management means 4.

Figure 4:
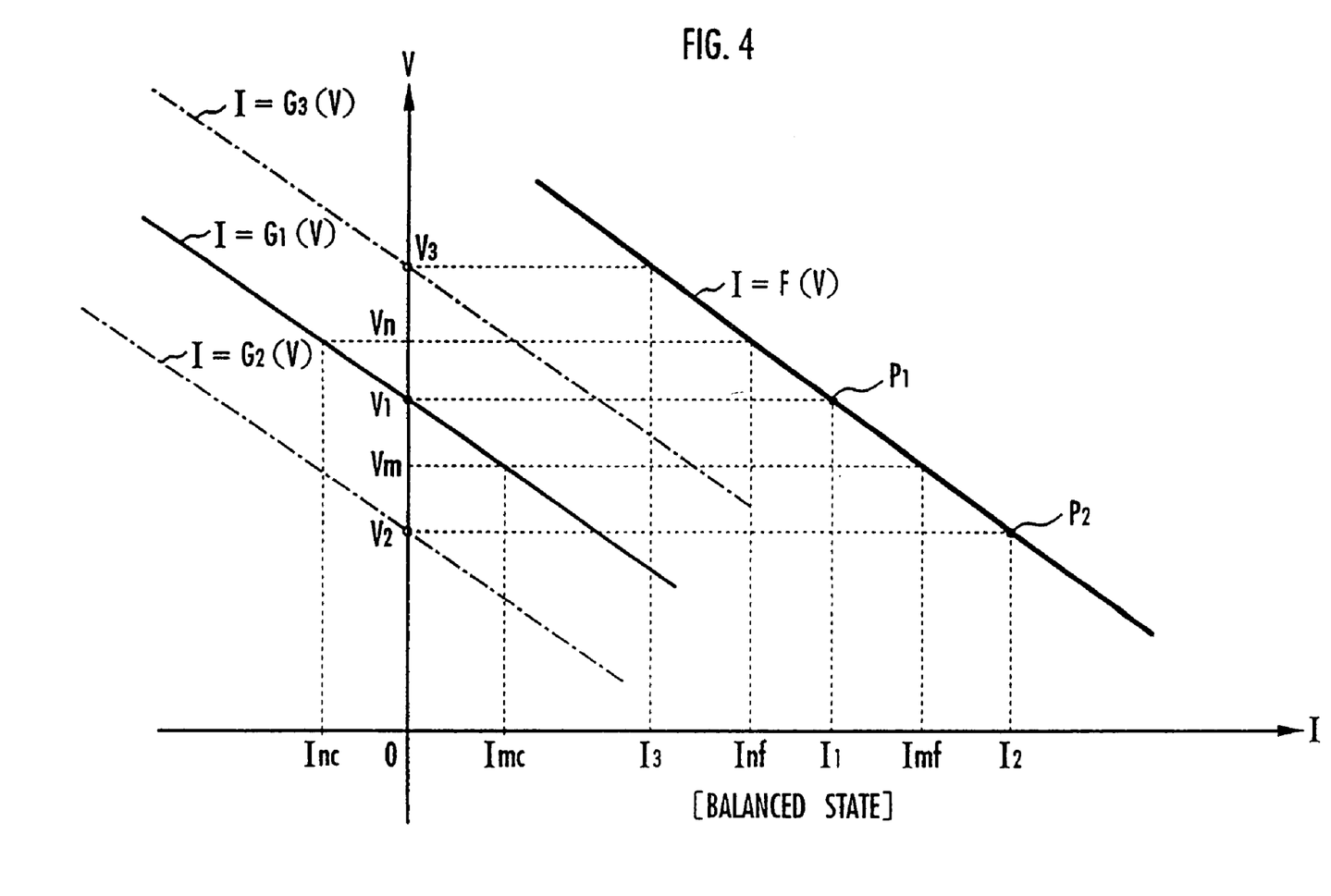
FIG. 4 is a graph illustrative of a process of calculating a corrective quantity for a target supply current.

In FIG. 4, a characteristic curve I=F(V) represents a current-voltage characteristic curve of the fuel cell 2, and a characteristic curve I=$G_1$(V) represents a current-voltage characteristic curve of the capacitor 3 at an open voltage $V_1$(Vcap_O=$V_1$). If the output voltage Vout and output current Ifc of the fuel cell 2 satisfy the relationship Ifc=F(Vout), then the amounts of air and hydrogen supplied to the fuel cell 2 are appropriate. If Ifc>F(Vout), then the amount of either air or hydrogen supplied to the fuel cell 2 runs short.

Therefore, the energy management means 4 sets the target supply current (Ifc_REQ) in order to maintain the relationship Ifc≦F(Vout), for thereby setting the amounts of air and hydrogen supplied to the fuel cell 2 to appropriate levels to control the output current (Ifc) of the fuel cell 2.

In order to explain a process of calculating a corrective quantity at the time the target supply current (Ifc_REQ) is increased, it is assumed that in the balanced state ($P_1$) in which the output current of the fuel cell 2 is controlled at the load current $I_1$, the load current changes from $I_1$ to $I_2$ in a step response fashion, the target supply current (Ifc_REQ) changes from $I_1$ to $I_2$ accordingly, and the balanced state ($P_1$) changes to a state ($P_2$) in which the output current of the fuel cell 2 is controlled at $I_2$ with a response delay. In the balanced state ($P_1$), the load current increases sharply, and the capacitor 3 outputs a discharging current to make up for the shortage in the output current of the fuel cell 2.

At this time, if the output voltage of the fuel cell 2 (Vout=the output voltage of the capacitor 3) drops from $V_1$ to Vm, then the discharging current (Icap) of the capacitor 3 is represented by:

$$Icap = G_1(Vm) \qquad (6)$$

$$= (Vcap\_O - Vm)/Rcap$$

$$= (V_1 - Vm)/Rcap$$

and the output current (Ifc) of the fuel cell 2 is expressed as follows:

$$Ifc = F(Vm) \qquad (7)$$

Therefore, as indicated by the following equation (8), an output voltage Vm (corresponding to a prescribed voltage according to the present invention) is determined at which the current which is the sum of the output current (Ifc) of the fuel cell 2 and the discharging current (Icap) of the capacitor 3 is the target supply current $I_2$:

$$F(Vm) + G_1(Vm) = I_2 \qquad (8)$$

and the discharging current (Imc in FIG. 4) of the capacitor 3 depending on Vm is subtracted from the target supply current $I_2$. In this manner, the air compressor 17 is prevented from operating wastefully, thus controlling the output current of the fuel cell 2.

Until the response delay of the fuel cell 2 is eliminated, i.e., until the discharging of the capacitor 3 is finished (Icap=0) and the open voltage (Vcap_O) of the capacitor 3 becomes $V_2$ depending on the target supply current $I_2$, the energy management means 4 repeats a correcting process of detecting the open voltage (Vcap_O) of the capacitor 3 at given sampling intervals, replacing the current-voltage characteristic curve ($I = G_1(V)$) according to the equation (8) with the current-voltage characteristic curve of the capacitor 3 depending on the detected open voltage (Vcap_O) to determine the output voltage Vm, and subtracting the discharging current of the capacitor 3 depending on Vm from the target supply current $I_2$ (in this case, the current-voltage characteristic curve of the capacitor 3 is shifted toward $I = G_2(V)$). During the response delay period of the fuel cell 2, therefore, the target supply current (Ifc_REQ) of the fuel cell 2 is set to an appropriate value depending on the magnitude of the discharging current (Icap) of the capacitor 3.

In order to explain a process of calculating a corrective quantity at the time the target supply current (Ifc_REQ) is reduced, it is assumed that in the balanced state ($P_1$) in which the output current of the fuel cell 2 is controlled at the load current $I_1$, the load current changes from $I_1$ to $I_3$ in a step response fashion, the target supply current (Ifc_REQ) changes from $I_1$ to $I_3$ accordingly, and the balanced state ($P_1$) changes to a state ($P_3$) in which the output current of the fuel cell 2 is controlled at $I_3$ with a response delay. In the balanced state ($P_1$), since the load current decreases sharply and the output voltage (Vout) of the fuel cell 2 increases, a charging current flows from the fuel cell 2 into the capacitor 3.

At this time, if the output voltage of the fuel cell 2 (Vout=the output voltage of the capacitor 3) increases from $V_1$ to Vn, then the charging current (Icap) of the capacitor 3 is represented by:

$$Icap = G_1(Vn) \qquad (9)$$

$$= (Vn - Vcap\_O)/Rcap$$

$$= (Vn - V_1)/Rcap$$

and the output current (Ifc) of the fuel cell 2 is expressed as follows:

$$Ifc = F(Vn) \qquad (10)$$

Therefore, as indicated by the following equation (11), an output voltage Vn (corresponding to a prescribed voltage according to the present invention) is determined at which the current which is produced by subtracting the discharging current (Icap) of the capacitor 3 from the output current (Ifc) of the fuel cell 2 is the target supply current $I_3$:

$$F(Vn) + G_1(Vn) = I_3 \qquad (11)$$

and the charging current (Inc in FIG. 4) of the capacitor 3 depending on Vn is added to the target supply current $I_3$. In this manner, the charging current flows into the capacitor 3, thereby preventing the amount of the gas supplied to the fuel cell 2 from suffering a shortage.

During the response delay period of the fuel cell 2, i.e., until the discharging of the capacitor 3 is finished (Icap=0) and the open voltage of the capacitor 3 becomes $V_3$ depending on the target supply current $I_3$, the energy management means 4 repeats a correcting process of detecting the open voltage (Vcap_O) of the capacitor 3 at given sampling intervals, replacing the current-voltage characteristic curve ($I = G_1(V)$) according to the equation (11) with the current-voltage characteristic curve of the capacitor 3 depending on the detected open voltage (Vcap_O) to determine the output voltage Vn, and adding the charging current of the capacitor 3 depending on Vn to the target supply current $I_3$ (in this case, the current-voltage characteristic curve of the capacitor 3 is shifted toward $I = G_3(V)$). During the response delay period of the fuel cell 2, therefore, the target supply current (Ifc_REQ) of the fuel cell 2 is set to an appropriate value depending on the magnitude of the charging current (Icap) of the capacitor 3.

Figure 5:
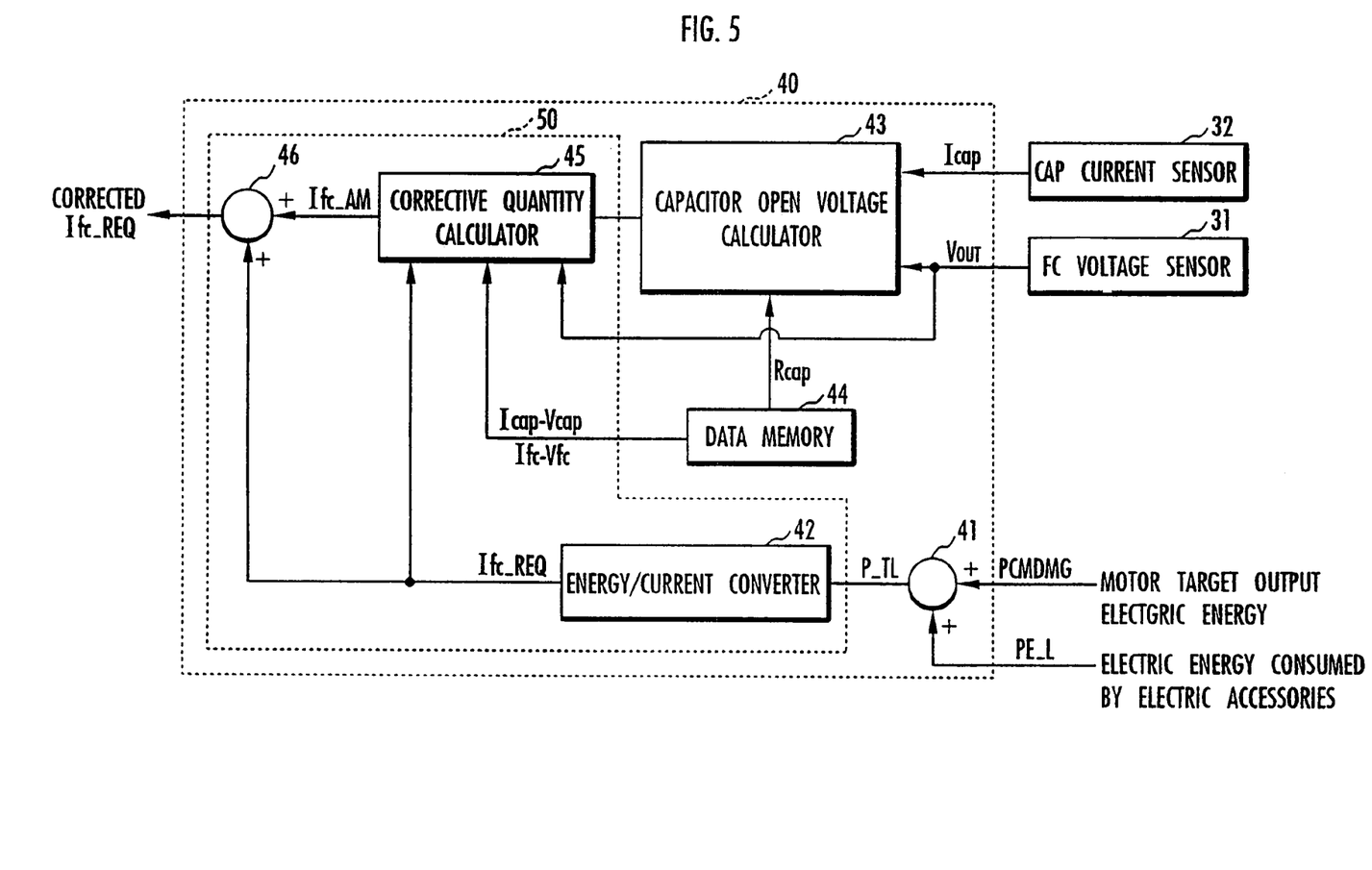
FIG. 5 is a block diagram of a control system for correcting the target supply current.

For carrying out the first correcting process and the second correcting process for correcting the target supply current (Ifc_REQ), the energy management means 4 has a control block 40 (corresponding to a target supply current correcting means according to the present invention) shown in FIG. 5.

The control block 40 comprises a first adder 41 for outputting a total consumed electric energy (P_TL) which is the sum of a motor target output electric energy (PCMDMG) outputted from the electric vehicle control unit 9 and an electric energy (Eload) consumed by the electric accessories which is calculated from the detected signals from the load current sensor 15 and the load voltage sensor 16, an energy/current converter 42 for converting the total consumed electric energy (P_TL) into a target supply current (Ifc_REQ), a capacitor open voltage calculator 43 (corresponding to a charging/discharging state recognizing means according to the present invention) for calculating an open voltage (Vcap_O) of the capacitor 3 according to the equation (5), a data memory 44 storing data of the internal resistance (Rcap) of the capacitor 3, a corrective quantity calculator 45 for calculating a corrective quantity (Ifc_AM) for the target supply current (Ifc_REQ) depending on the open voltage (Vcap_O) of the capacitor 3 and the target supply current (Ifc_REQ), and a second adder 46 for adding the corrective quantity (Ifc_AM) to the target supply current (Ifc_REQ) thereby to correct the target supply current (Ifc_REQ).

The capacitor open voltage calculator 43 detects the charging/discharging current (Icap) of the capacitor 3 from the detected signal from the capacitor current sensor 32, and also detects the output voltage (Vout) of the capacitor 3 from the detected signal from the fuel cell voltage sensor 31. The capacitor open voltage calculator 43 reads the data of the internal resistance (Rcap) of the capacitor 3 from the data memory 44, and calculates the open voltage (Vcap_O) of the capacitor 3 from the charging/discharging current (Icap) of the capacitor 3, the output voltage (Vout) of the capacitor 3, and the internal resistance (Rcap) of the capacitor 3 according to the equation (5).

The corrective quantity calculator 45 calculates the corrective quantity (Ifc_AM) for the target supply current (Ifc_REQ) according to the process described above with reference to FIG. 4, from the open voltage (Vcap_O) of the capacitor 3 which is outputted from the capacitor open voltage calculator 43, the target supply current (Ifc_REQ) for the fuel cell 2 which is outputted from the energy/current converter 42, the current-voltage characteristic data (Icap–Vcap in FIG. 5, corresponding to I=F(V) in FIG. 4) of the fuel cell 2 which is read from the data memory 44, and the current-voltage characteristic data (Ifc–Vfc in FIG. 5, corresponding to I=$G_1$(V) in FIG. 4) of the capacitor 3.

The second adder 46 adds the corrective quantity (Ifc_AM) to the target supply current (Ifc_REQ) thereby to correct the target supply current (Ifc_REQ).

Figure 6:
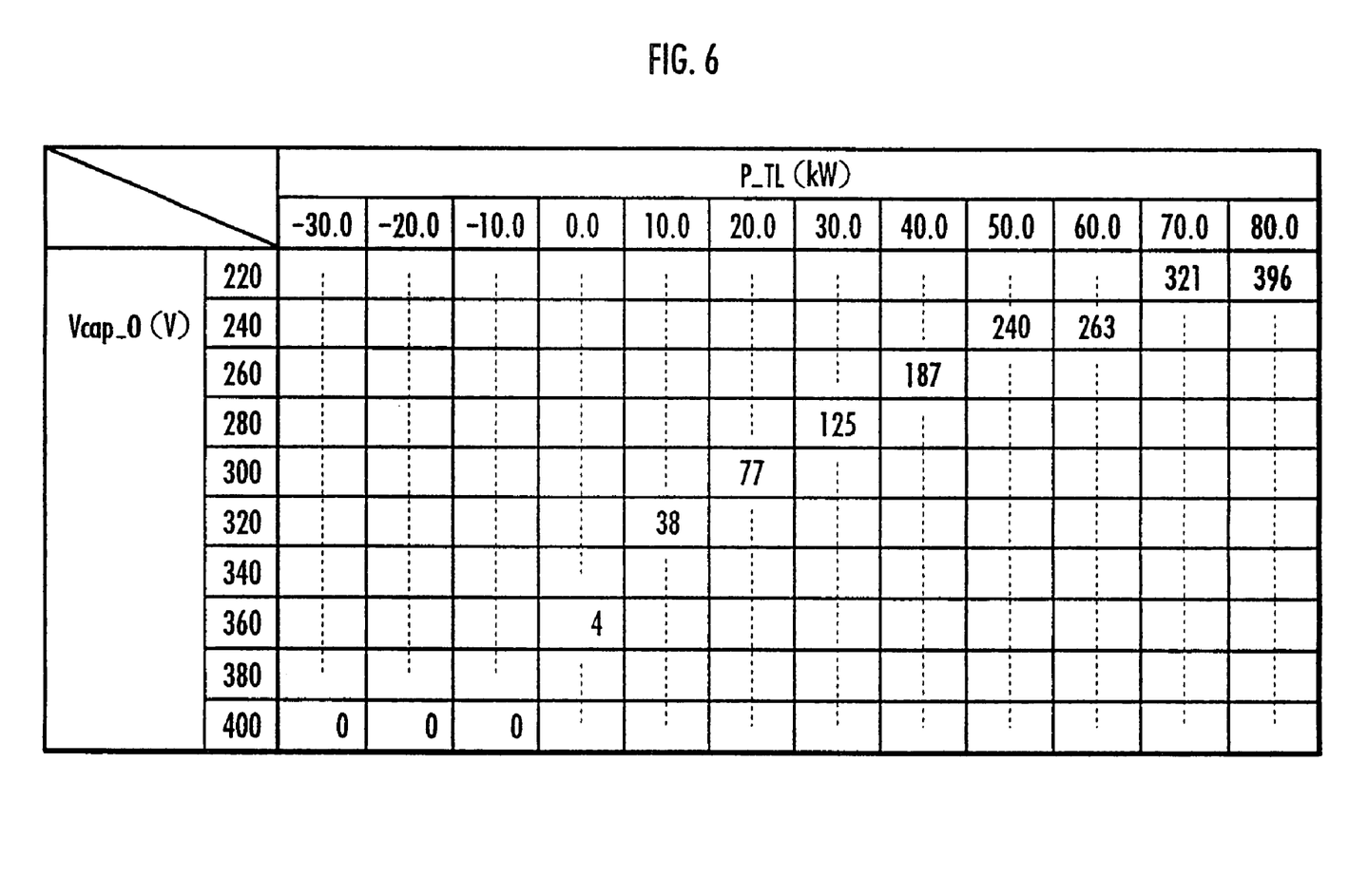
FIG. 6 is a diagram showing a data table containing data for correcting the target supply current.

An enclosed portion 50 in the control block 40 may be implemented in advance as a data map for shortening the time required to calculate the corrective quantity (Ifc_AM). FIG. 6 shows a data map or table of target supply currents (Ifc_REQ) for the fuel cell 2 which have been calculated according to the process described above with reference to FIG. 4, using the open voltage (Vcap_O) of the capacitor 3 and the total consumed electric energy (P_TL) as parameters. For example, it can be determined from the data map that a target supply current Ifc_REQ corresponding to inputs of Vcap_O=300 (V) and P_TL=20 (kW) is 77 (A).

In the illustrated embodiment, both the first correcting process and the second correcting process are carried out to correct the target supply current (Ifc_REQ) for the fuel cell 2 both when the capacitor 3 is discharged and when the capacitor 3 is charged. However, the advantages of the present invention are also available if the fuel cell power supply performs only one of the first correcting process and the second correcting process.

In the illustrated embodiment, the target supply current (Ifc_REQ) for the fuel cell 2 is calculated accurately using the current-voltage characteristic data of the capacitor 3 and the current-voltage characteristic data of the fuel cell 2 which are stored in the data memory 44. However, the advantages of the present invention are also available if the target supply current (Ifc_REQ) is corrected depending on the current value (corresponding to a charging/discharging state of the capacitor according to the present invention) detected by the capacitor current sensor 32, without using the current-voltage characteristic data of the capacitor 3 and the current-voltage characteristic data of the fuel cell 2.

Although a certain preferred embodiment of the present invention has been shown and described in detail, it should be understood that various changes and modifications may be made therein without departing from the scope of the appended claims.

What is claimed as new and desired to be protected by Letters Patent of the United States is:

1. A fuel cell power supply comprising:
   a fuel cell;
   reacting gas supply means for supplying a reacting gas to said fuel cell;
   fuel cell control means for controlling an amount of the reacting gas supplied from said reacting gas supply means to said fuel cell based on a target supply current determined depending on a current demanded by a load when said fuel cell is connected to the load and a current is supplied to the load;
   a capacitor connected parallel to said fuel cell and chargeable by said fuel cell, said capacitor being dischargeable to supply the current demanded by the load when said target supply current increases within a time shorter than a response delay which is caused in said fuel cell while said fuel cell control means controls an output current of said fuel cell, and the output current of said fuel cell is smaller than the current demanded by the load;
   charging/discharging state recognizing means for recognizing a charging/discharging state of said capacitor;
   target supply current correcting means for, immediately after said target supply current undergoes a change causing said response delay, performing at least one of a first correcting process of reducing said target supply current if said change is an increase in said target supply current, and a second correcting process of increasing said target supply current if said change is a reduction in said target supply current, depending on the charging/discharging state of said capacitor recognized by said charging/discharging state recognizing means;
   capacitor voltage detecting means for detecting an output voltage of said capacitor;
   memory means for storing resistance data of an internal resistance of said capacitor; and
   capacitor current detecting means for detecting a charging/discharging current of said capacitor,
   wherein said charging/discharging state recognizing means comprises means for recognizing an open voltage of said capacitor as said charging/discharging state, and said target supply current correcting means comprises means for performing said first correcting process by determining a prescribed voltage at which a current produced by adding a discharging current of said capacitor depending on said prescribed voltage which is recognized from voltage-current characteristic data of said capacitor based on the open voltage of said capacitor recognized by said charging/discharging state recognizing means, to the output current of said fuel cell depending on the prescribed voltage which is recognized from voltage-current characteristic data of said fuel cell, is equal to said target supply current, and subtracting the discharging current of said capacitor depending on said prescribed voltage from said target supply current, and
   means for calculating a voltage drop across said internal resistance based on the resistance data stored by said memory means and the charging/discharging current detected by said capacitor current detecting means, and recognizing the open voltage of said capacitor from the voltage detected by said capacitor voltage detecting means and said calculated voltage drop.

2. A fuel cell power supply according to claim 1, wherein said target supply current correcting means comprises means for performing said second connecting process by determining a prescribed voltage at which a current produced by subtracting a charging current of said capacitor depending on said prescribed voltage which is recognized from voltage-current characteristic data of said capacitor based on the open voltage of said capacitor recognized by said charging/discharging state recognizing means, from the output current of said fuel cell depending on the prescribed voltage which is recognized from voltage-current characteristic data of said fuel cell, is equal to said target supply current, and adding the charging current of said capacitor depending on said prescribed voltage to said target supply current.

3. The fuel cell power supply according to claim 1, wherein said charging/discharging state recognizing means recognizes the charging/discharging state of said capacitor based on a current of said capacitor.

4. The fuel cell power supply according to claim 1, wherein said charging/discharging state recognizing means recognizes the charging/discharging state of said capacitor regularly.

5. A fuel cell power supply comprising:

a fuel cell;

reacting gas supply means for supplying a reacting gas to said fuel cell;

fuel cell control means for controlling an amount of the reacting gas supplied from said reacting gas supply means to said fuel cell based on a target supply current of the fuel cell when said fuel cell is connected to a load and a current is supplied to the load;

a capacitor connected parallel to said fuel cell and chargeable by said fuel cell, said capacitor being dischargeable to supply a current demanded by the load when the current demanded by the load increases within a time shorter than a response delay of said fuel cell and the output current of said fuel cell becomes short;

charging/discharging state recognizing means for recognizing a charging/discharging state of said capacitor;

target supply current determining means for determining said target supply current depending on said current demanded by the load and the charging/discharging state of said capacitor recognized by said charging/discharging state recognizing means immediately after the current demanded by the load increases within a time shorter than a response delay of said fuel cell and the output current of said fuel cell becomes short, capacitor voltage detecting means for detecting an output voltage of said capacitor;

memory means for storing resistance data of an internal resistance of said capacitor; and capacitor current detecting means for detecting a charging/discharging current of said capacitor, wherein said charging/discharging state recognizing means comprises means for recognizing an open voltage of said capacitor as said charging/discharging state, and said target supply current determining means comprises means for determining a prescribed voltage at which a current produced by adding a discharging current of said capacitor depending on said prescribed voltage which is recognized from voltage-current characteristic data of said capacitor based on the open voltage of said capacitor recognized by said charging/discharging state recognizing means, to the output current of said fuel cell depending on the prescribed voltage which is recognized from voltage-current characteristic data of said fuel cell, is equal to said current demanded by the load, and subtracting the discharging current of said capacitor depending on said prescribed voltage from said current demanded by the load, means for calculating a voltage drop across said internal resistance based on the resistance data stored by said memory means and the charging/discharging current detected by said capacitor current detecting means, and recognizing the open voltage of said capacitor from the voltage detected by said capacitor voltage detecting means and said calculated voltage drop.

6. The fuel cell power supply according to claim 5, wherein said target supply current determining means comprises means for determining a prescribed voltage at which a current produced by subtracting a charging current of said capacitor depending on said prescribed voltage which is recognized from voltage-current characteristic data of said capacitor based on the open voltage of said capacitor recognized by said charging/discharging state recognizing means, from the output current of said fuel cell depending on the prescribed voltage which is recognized from voltage-current characteristic data of said fuel cell, is equal to said current demanded by the load, and adding the charging current of said capacitor depending on said prescribed voltage to said current demanded by the load.

* * * * *